United States Patent
Pozzi

(10) Patent No.: US 8,782,835 B2
(45) Date of Patent: Jul. 22, 2014

(54) SEAT CUSHION WITH INTEGRATED SEAT FRAME ATTACHMENT STRUCTURE

(75) Inventor: Alexander N. Pozzi, Winston-Salem, NC (US)

(73) Assignee: BE Aerospace, Inc., Wellington, FL (US)

( * ) Notice: Subject to any disclaimer, the term of this patent is extended or adjusted under 35 U.S.C. 154(b) by 183 days.

(21) Appl. No.: 13/424,502

(22) Filed: Mar. 20, 2012

(65) Prior Publication Data

US 2013/0247303 A1 Sep. 26, 2013

(51) Int. Cl.
*A47C 7/18* (2006.01)

(52) U.S. Cl.
USPC ............ 5/653; 5/411; 297/440.22; 244/118.6

(58) Field of Classification Search
USPC .............. 5/411, 653, 655.9, 740; 297/440.22, 297/DIG. 1; 244/118.6
See application file for complete search history.

(56) References Cited

U.S. PATENT DOCUMENTS

| | | | | |
|---|---|---|---|---|
| 2,981,317 A | * | 4/1961 | Cartwright, Jr. et al. | .. 297/216.1 |
| 4,819,288 A | * | 4/1989 | Lowthian | .......................... 5/653 |
| 5,485,976 A | * | 1/1996 | Creed et al. | ................ 244/118.6 |
| 5,542,747 A | * | 8/1996 | Burchi | ..................... 297/452.55 |
| 5,632,053 A | * | 5/1997 | Weingartner et al. | .......... 5/655.9 |
| 6,652,034 B1 | * | 11/2003 | Schramm et al. | ........ 297/452.35 |
| 7,032,967 B2 | * | 4/2006 | Pyzik et al. | ................... 297/214 |
| 2004/0216236 A1 | * | 11/2004 | Lievestro et al. | .............. 5/655.9 |

* cited by examiner

*Primary Examiner* — Michael Trettel

(74) *Attorney, Agent, or Firm* — Shumaker, Loop & Kendrick, LLP

(57) ABSTRACT

A seat cushion, such as for use in an aircraft passenger seat, including a layer of open cell foam for passenger comfort, a closed cell foam core for flotation and structural support, and support structure positioned on the underside of the seat cushion for directly engaging underlying beams of a seat frame to attach the seat cushion to the seat frame without the need for additional fasteners.

17 Claims, 4 Drawing Sheets

SEAT CUSHION WITH INTEGRATED SEAT FRAME ATTACHMENT STRUCTURE

TECHNICAL FIELD AND BACKGROUND OF THE INVENTION

The present invention relates generally to seat cushion construction and the attachment thereof to an underlying seat frame, and more particularly, to a seat cushion having integrated structure for mounting the seat cushion directly to an underlying seat frame without the need for additional fasteners.

Aircraft passenger seat cushions typically include a combination of open cell foam for passenger comfort and closed cell foam for structural support and flotation. Conventional seat cushions, regardless of their construction and foam type, typically require fasteners for attaching the seat cushion to an underlying metal or composite seat pan or fabric diaphragm spanning the seat crossbars.

Referring to FIG. 5, a conventional aircraft seat cushion is shown generally at reference number 50, and includes a soft foam cushion 52 attached to the top of a hard flotation foam slab 54 using hook-and-loop fasteners 56. Referring to FIG. 6, the assembled seat cushion 50, which lacks its own integrated fastener, must be attached to the hard metal or plastic pan 58 fastened to the main seat crossbars 60. Alternatively, referring to FIG. 7, the seat cushion 50 may be attached to a thin, flexible diaphragm 62 stretched across the main seat crossbars 60. Regardless of the type of underlying member spanning the crossbars 60, the presence of such a member and conventional seat cushion construction require additional components and fasteners for attaching the cushion to the seat frame, thus increasing part count, assembly time, weight and cost.

Accordingly, it would be desirable to provide an improved seat cushion construction that overcomes the disadvantages of prior art seat cushions and obviates the need for additional fasteners and manufacturing steps for attaching the seat cushion to an underlying frame.

BRIEF SUMMARY OF THE INVENTION

In one aspect, a seat cushion is provided herein including integrated seat frame attachment structure.

In another aspect, the integrated structure obviates the need for a separate seat pan or diaphragm spanning the lateral beams of the seat, as well as additional fasteners for attaching the seat cushion to the seat pan or diaphragm.

In another aspect, the seat cushion generally includes a layer of comfort foam, a layer of flotation foam for flotation and structural support, and integrated structure for attaching the seat cushion directly to the underlying lateral seat beams.

In yet another aspect, the integrated structure may be a platform or other rigid body, and the structure may be at least partially encapsulated within the cushion or otherwise retained to the cushion.

In yet another aspect, the integrated structure functions to attach the seat cushion directly to the seat frame as well as support the passenger's weight.

In yet another aspect, the seat cushion snaps directly into engagement with the lateral seat beams.

To achieve the foregoing and other aspects and advantages, in one embodiment a seat cushion is provided herein including a top layer of open cell foam for passenger comfort, a closed cell foam core for flotation and structural support, and rigid structure integrated into the underside of the seat cushion for directly engaging underlying beams of a seat frame to attach the seat cushion to the seat frame.

The rigid structure may be a unitary platform positioned substantially covering the underside of the seat cushion. The platform may define spaced semi-circular recessed portions that open in the direction away from the bottom of the seat cushion that are interconnected through a generally planar middle portion, wherein the recessed portions engage the beams of the seat frame. The recessed portions may snap fit engage the underlying beams of the seat frame.

The platform may include a generally planar center portion terminating at opposed ends in curved flanges that extend upward to engage the beams of the seat frame. The rigid structure may include a plurality of spaced semi-circular clips.

The rigid structure may be a sheet having a nominal thickness as compared to the thickness of the top layer of open cell foam and the closed cell foam core.

The rigid structure may be at least partially encapsulated in at least one of the top layer of open cell foam and the closed cell foam core.

According to another embodiment of the invention, an aircraft passenger seat is provided herein including a seat frame having spaced lateral beams for supporting a seat cushion thereon, and a seat cushion including a top layer of open cell foam for passenger comfort, a closed cell foam core for flotation and structural support, and a rigid platform positioned on the underside of the seat cushion for directly engaging the spaced lateral beams of the seat frame to attach the cushion thereto.

The rigid platform may be unitary or include a plurality of clips positioned on the underside of the seat cushion in alignment with the underlying lateral beams. The rigid platform may snap fit engage the spaced lateral beams to mount the seat cushion thereon, obviating the need for a separate seat pan or diaphragm attached directly to the lateral beams, such as using rivets, as well as additional fasteners for attaching the seat cushion to the seat pan or diaphragm. The rigid platform may be at least partially encapsulated in one of the top layer of open cell foam and the closed cell foam core, or otherwise retained on the cushion.

Additional features, aspects and advantages of the invention will be set forth in the detailed description which follows, and in part will be readily apparent to those skilled in the art from that description or recognized by practicing the invention as described herein. It is to be understood that both the foregoing general description and the following detailed description present various embodiments of the invention, and are intended to provide an overview or framework for understanding the nature and character of the invention as it is claimed. The accompanying drawings are included to provide a further understanding of the invention, and are incorporated in and constitute a part of this specification.

BRIEF DESCRIPTION OF THE DRAWINGS

These and other features, aspects and advantages of the present invention are better understood when the following detailed description of the invention is read with reference to the accompanying drawings, in which.

DETAILED DESCRIPTION OF THE INVENTION

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

The seat cushion embodiments shown and described herein can be used in aircraft seats and other seating applications in which a more comfortable, durable and readily installable seat cushion is desired. The seat cushion embodiments provided herein are particularly well suited for use in aircraft seats requiring lightweight and FAA flotation-compliant cushions, and in seat applications including seat frames having spaced lateral beams for supporting the seat cushion thereon, also referred to herein as "lateral crossbars." Although the seat cushion is shown configured to engage lateral beams of the seat frame, and in particular two lateral beams, it is envisioned that the support platform can be configured (e.g., shaped) to directly engage with other seat frame structure.

The seat cushion embodiments shown and described herein obviate the need for a pre-installed metal or composite pan or fabric diaphragm attached to (e.g., riveted) and spanning spaced lateral beams of the seat frame. The seat cushion embodiments shown and described herein further obviate the need for additional fasteners for attaching the seat cushion to the lateral beams of the seat frame.

Figure 1:
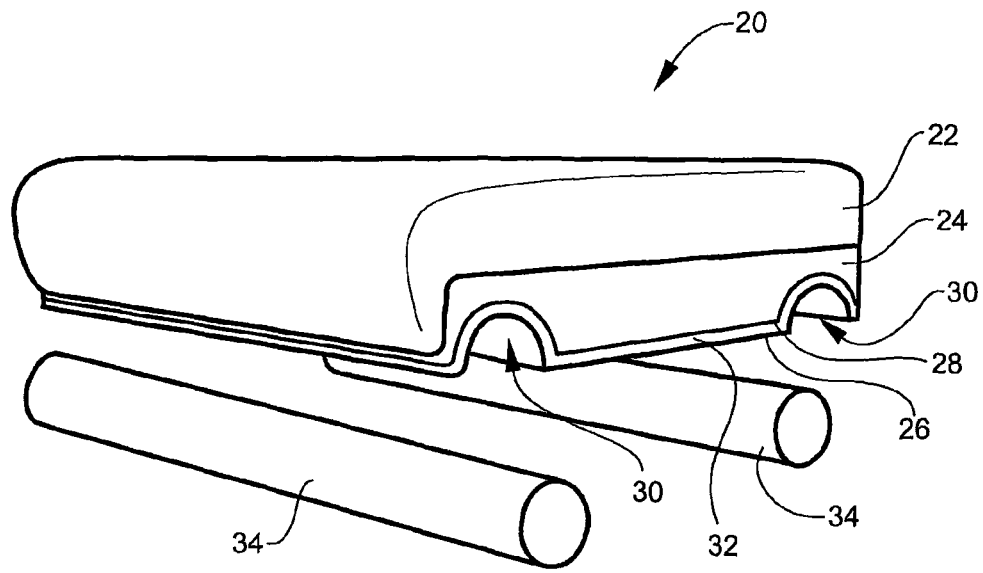
FIG. 1 shows a seat cushion constructed in accordance with an embodiment of the invention in position over underlying beams of a seat frame.

Referring to FIG. 1, a seat cushion constructed according to one embodiment of the invention is shown generally at reference numeral 20. The seat cushion 20 generally includes a top layer of comfort foam 22, and underlying foam core 24 for flotation and structural support, and rigid support structure 26 positioned on the underside of the seat cushion. The top layer of comfort foam 22 may be constructed, for example, from open cell foam such as polyurethane. The closed cell foam core 24 may be constructed, for example, from polyethylene. The arrangement of the comfort foam and closed cell foam may be provided in layers or other arrangements, and the arrangement shown is not intended to limit the invention. Although not shown, the seat cushion 20 may also include additives, coatings, coverings, adhesives, water-blocking layers, insulting layers, upholstery, etc.

The rigid support structure 26 is intended to support the passenger's weight and directly attach the seat cushion 20 to underlying lateral beams of the seat frame without the need for additional fasteners. The support structure 26 has a nominal thickness as compared to the thickness of the top layer of open cell foam 22 and the closed cell foam core 24.

As shown in FIG. 1, the support structure 26 may be in the form of a sheet-like platform 28 positioned substantially covering the bottom of the seat cushion 20. In one embodiment, the platform 28 is unitary and defines spaced semi-circular portions 30 connected through a middle planar portion 32. The middle portion 32 spans the underlying lateral beams 34 and spaces the semi-circular portions 30 apart such that they align over the lateral beams.

The semi-circular portions 30 are shaped to compliment the spaced lateral beams 34, which are tubular as shown. The semi-circular portions 32 preferably snap fit engage the lateral beams 34. It is envisioned that the lateral beams may have shapes other than cylindrical, and the recessed portions of the support structure 26 may be shaped to complement the shape of the lateral beams. The seat cushion 20 may be held in place on the seat frame by way of interference fit between the recessed portions and the lateral beams, and/or by seat cushion upholstery.

Figure 2A:
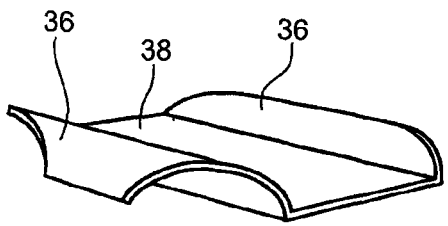
FIGS. 2a-f show various shapes of the support structure of the seat cushion.
Figure 2B:
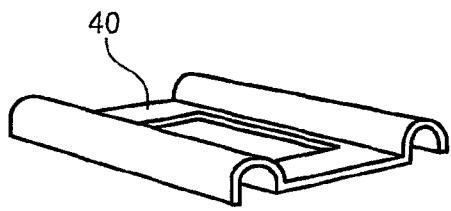
Figure 2C:
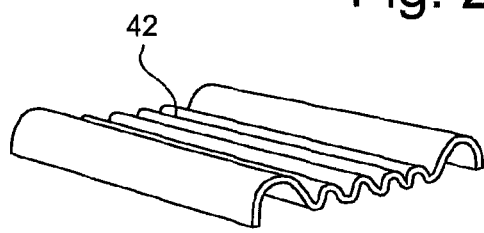
Figure 2D:
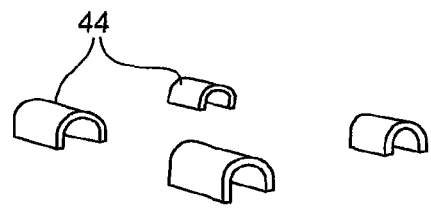
Figure 2E:
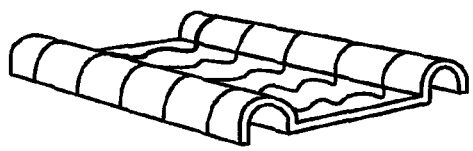
Figure 2F:
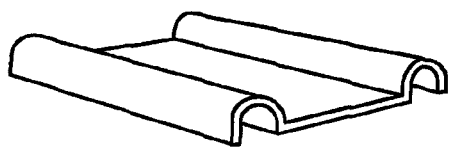

Referring to FIGS. 2a-f, the support structure 26 may have other shapes, only some of which are illustrated. Referring specifically to FIG. 2a, the support structure 26 may define spaced, upwardly-extending curved flanges 36 connected through a center portion 38, wherein the spaced, upwardly-extending curved flanges shaped to complement the spaced tubular beams of the seat frame for tight-fitting engagement therewith. Referring to FIG. 2b, the support structure 26 may include a windowed center portion 40 for lightweight. Referring to FIG. 2c, the support structure 26 may include a corrugated center portion 42 for added strength. Referring to FIG. 2d, the support structure 26 may include a plurality of spaced semi-circular clips 44 positioned about the corners of the bottom of the seat cushion 20 in alignment with the underlying lateral beams. Referring to FIGS. 2e and 2f, the support structure 26 may include spaced segments or may be unitary, respectively.

The support structure 26 is integrated into the construction of the seat cushion 20 and thus forms a permanent part thereof. The support structure 26 may be attached to the bottom of the seat cushion 20 such as through bonding, or may be at least partially encapsulated in one of the open cell foam 22 and the closed cell foam core 24.

Figure 3:
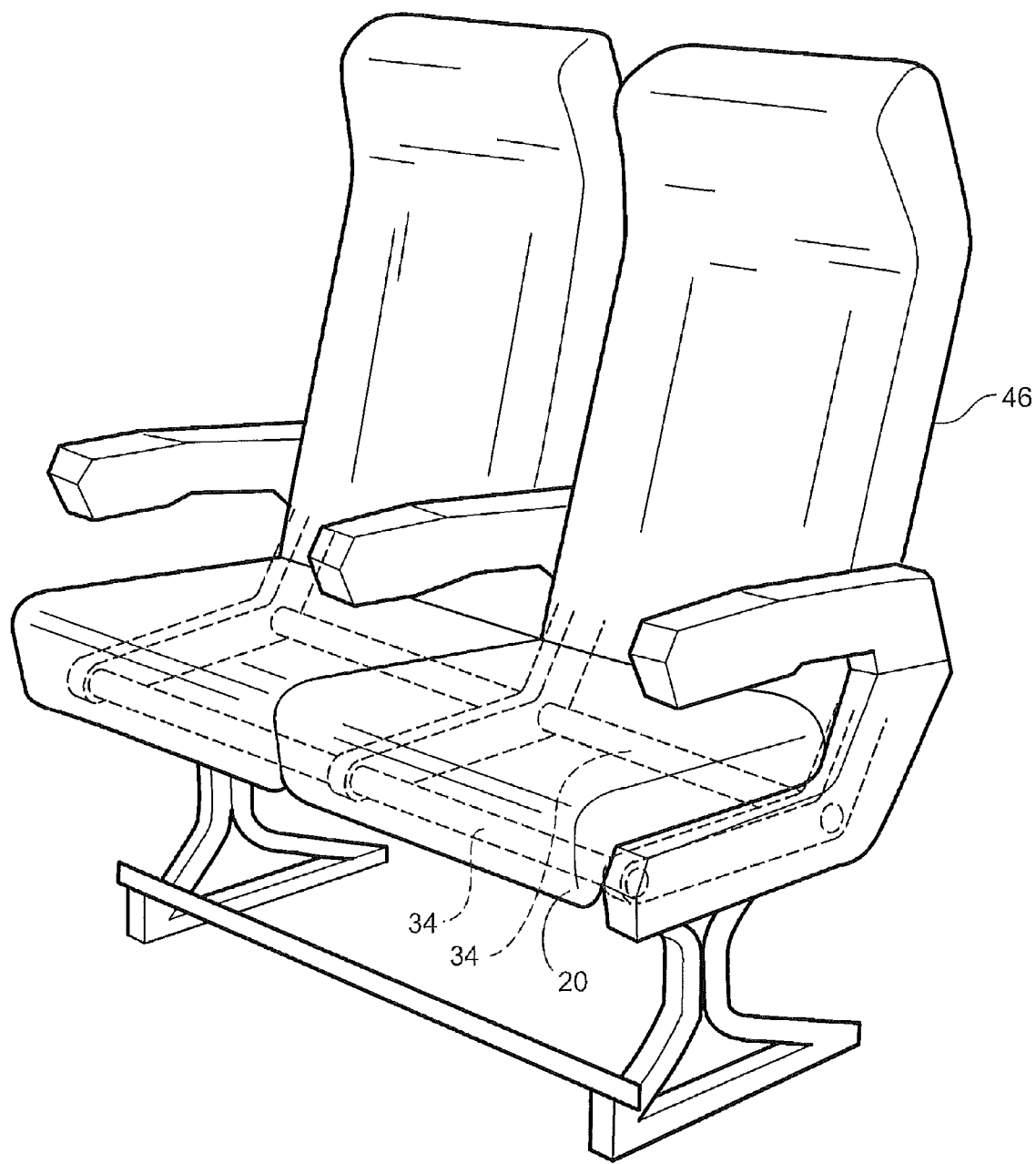
FIG. 3 is an aircraft passenger seat including a seat cushion constructed and attached according to an embodiment of the invention.
Figure 4:
FIG. 4 shows the seat cushion removed from an aircraft passenger seat to illustrate the underlying seat beams to which the seat cushion snap fit engages.
Figure 5:
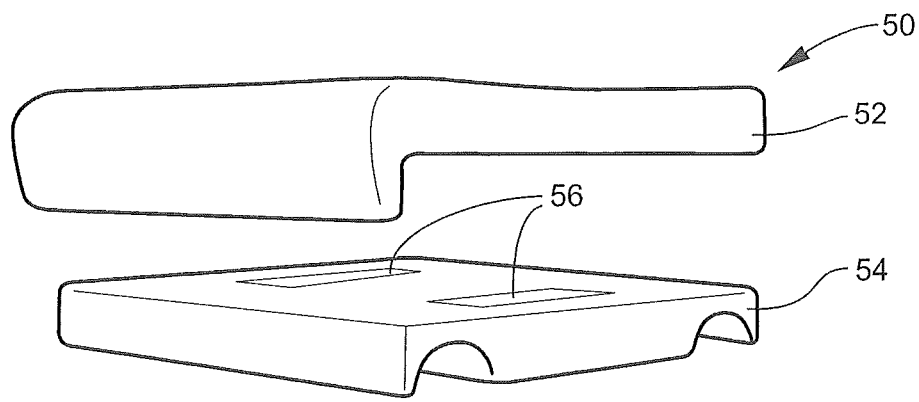
FIG. 5 shows a related art seat cushion lacking integrated support structure.
Figure 6:
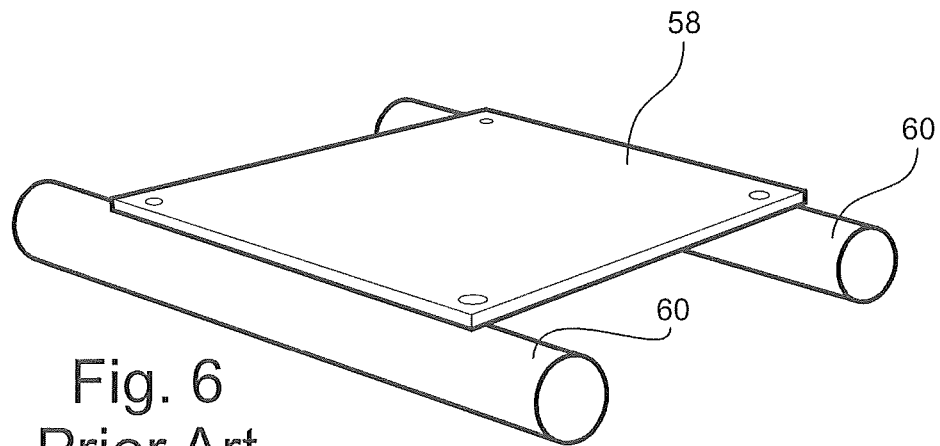
FIG. 6 shows a related art seat frame including a metal or composite seat pan spanning the lateral beams to which a seat cushion attaches.
Figure 7:
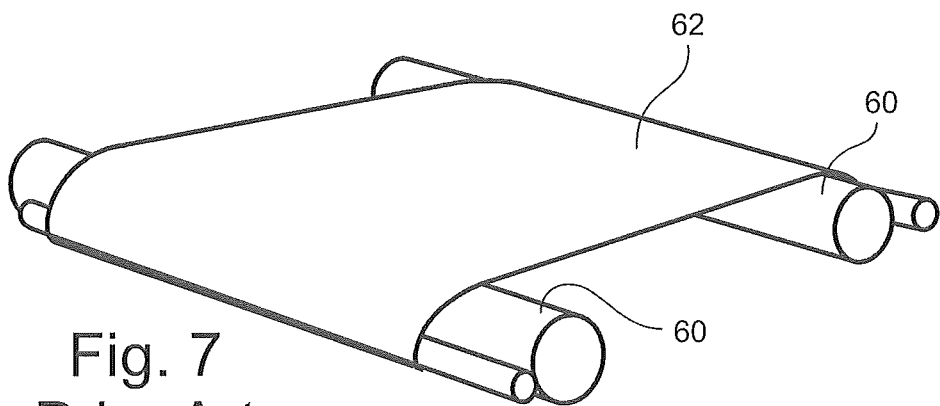
FIG. 7 shows a related art seat frame including a fabric diaphragm spanning the lateral beams to which a seat cushion attaches.

Referring to FIGS. 3 and 4, in another embodiment, an aircraft passenger seat 46 is provided herein including a seat frame having spaced lateral beams 34 cooperatively supporting the seat cushion 20 thereon. The seat cushion 20 snap fit engages with the lateral beams 34 to attach the seat cushion to the seat frame without the need for a pre-installed seat pan or fabric diaphragm and additional fasteners.

The foregoing description provides embodiments of the invention by way of example only. It is envisioned that other embodiments may perform similar functions and/or achieve similar results. Any and all such equivalent embodiments and examples are within the spirit and scope of the present invention and are intended to be covered by the appended claims.

What is claimed is:

1. A seat cushion, comprising:
    a layer of open cell foam for passenger comfort;
    a closed cell foam core for flotation and structural support; and
    support structure positioned on the underside of the seat cushion for directly engaging underlying beams of a seat frame to attach the seat cushion to the seat frame, the support structure integrated into the construction of the seat cushion to form a permanent part thereof and prevent the support structure from being separated from the seat cushion, the support structure including a sheet-like platform substantially covering the underside of the seat cushion.

2. The seat cushion according to claim 1, wherein the platform comprises spaced semi-circular portions connected through a middle planar portion, the semi-circular portions shaped to directly engage spaced tubular beams of the seat frame.

3. The seat cushion according to claim 1, wherein the support structure comprises spaced, upwardly-extending curved flanges connected through a center portion, wherein the spaced, upwardly-extending curved flanges are shaped to complement tubular beams of the seat frame for engagement therewith.

4. The seat cushion according to claim 1, wherein the support structure is rigid and unitary.

5. The seat cushion according to claim 1, wherein the support structure comprises a plurality of spaced semi-circular clips.

6. The seat cushion according to claim 1, wherein the support structure has a nominal thickness as compared to the thickness of the top layer of open cell foam and the closed cell foam core.

7. The seat cushion according to claim 1, wherein the support structure snap fit engages the underlying beams of the seat frame.

8. The seat cushion according to claim 1, wherein the support structure is at least partially encapsulated in one of the top layer of open cell foam and the closed cell foam core.

9. An aircraft passenger seat, comprising:
a seat frame including spaced lateral beams; and
a seat cushion including a top layer of open cell foam for passenger comfort, a closed cell foam core for flotation and structural support, and support structure positioned on the underside of the seat cushion for directly engaging the spaced lateral beams of the seat frame to attach the seat cushion to the seat frame without the need for additional fasteners, the support structure integrated into the construction of the seat cushion to form a permanent part thereof and prevent the support structure from being separated from the seat cushion.

10. The aircraft passenger seat according to claim 9, wherein the support structure is a platform integrated into the seat cushion construction.

11. The aircraft passenger seat according to claim 10, wherein the platform is a unitary sheet substantially covering the underside of the seat cushion.

12. The aircraft passenger seat according to claim 10, wherein the platform comprises spaced semi-circular portions connected through a middle planar portion, the semi-circular portions directly engaging the spaced lateral beams of the seat frame and the planar middle portion spanning the spaced lateral beams of the seat frame.

13. The aircraft passenger seat according to claim 9, wherein the support structure comprises a plurality of spaced semi-circular clips that directly engage the spaced lateral beams of the seat frame.

14. The aircraft passenger seat according to claim 9, wherein the support structure comprises spaced, upwardly-extending curved flanges connected through a center portion, wherein the spaced, upwardly-extending curved flanges are shaped to complement the spaced lateral beams of the seat frame for engagement therewith.

15. The aircraft passenger seat according to claim 9, wherein the support structure is a rigid, sheet-like platform having a nominal thickness as compared to the thickness of the top layer of open cell foam and the closed cell foam core.

16. The aircraft passenger seat according to claim 9, wherein the support structure snap fit engages directly with the spaced lateral beams of the seat frame.

17. The aircraft passenger seat according to claim 9, wherein the support structure is at least partially encapsulated in one of the top layer of open cell foam and the closed cell foam core.

* * * * *